(12) United States Patent
Roth

(10) Patent No.: US 8,349,923 B2
(45) Date of Patent: Jan. 8, 2013

(54) FLAME RETARDANT COMPOSITIONS COMPRISING STERICALLY HINDERED AMINES

(75) Inventor: Michael Roth, Lautertal (DE)

(73) Assignee: BASF SE, Ludwigshafen (DE)

( * ) Notice: Subject to any disclaimer, the term of this patent is extended or adjusted under 35 U.S.C. 154(b) by 324 days.

(21) Appl. No.: 12/745,903

(22) PCT Filed: Dec. 12, 2008

(86) PCT No.: PCT/EP2008/067384
§ 371 (c)(1),
(2), (4) Date: Sep. 1, 2010

(87) PCT Pub. No.: WO2009/080554
PCT Pub. Date: Jul. 2, 2009

(65) Prior Publication Data
US 2010/0324182 A1  Dec. 23, 2010

(30) Foreign Application Priority Data
Dec. 21, 2007 (EP) .................................. 07150353

(51) Int. Cl.
*C08K 5/34* (2006.01)
*C07D 211/46* (2006.01)

(52) U.S. Cl. ............ 524/98; 524/100; 524/101; 524/99; 546/186; 546/191; 546/228; 546/242; 546/245

(58) Field of Classification Search ............... 524/98, 524/99, 100, 101; 546/186, 191, 228, 242, 546/245
See application file for complete search history.

(56) References Cited

U.S. PATENT DOCUMENTS

| 5,244,949 | A | * | 9/1993 | Wirth et al. | 524/100 |
| 6,028,129 | A | * | 2/2000 | Pfaendner et al. | 524/99 |
| 2004/0087689 | A1 | | 5/2004 | Kaprinidis | |
| 2008/0214715 | A1 | * | 9/2008 | Costanzi | 524/414 |
| 2009/0131565 | A1 | * | 5/2009 | Roth | 524/100 |

FOREIGN PATENT DOCUMENTS
WO 2007/128678 A 11/2007
WO 2008/0214715 A 9/2008

* cited by examiner

Primary Examiner — Robert D. Harlan
(74) Attorney, Agent, or Firm — Tyler A. Stevenson

(57) ABSTRACT

The present invention relates to a novel method of flame retarding a polymeric substrate by adding a small but efficient amount of a synergistic mixture of at least one sterically hindered N-alkoxyamine (NOR), at least a metal salt of hypophosphorous (phosphinic) acid and at least one organo-halogen flame retardant. A further aspect of the invention is the flame retardant composition itself and together with a polymer. The present invention also relates to polymeric articles (e.g. moldings, films, fibers, etc.) that are stabilized against light, heat and oxygen and made flame retardant by incorporation of at least one sterically hindered N-alkoxy amine, at least a metal salt of hypophosphorous acid (phosphinic acid) and at least one organo-halogen flame retardant.

14 Claims, No Drawings

FLAME RETARDANT COMPOSITIONS COMPRISING STERICALLY HINDERED AMINES

The present invention relates to a novel method of flame retarding a polymeric substrate by adding a small but efficient amount of a synergistic mixture of at least one sterically hindered N-alkoxyamine (NOR), at least a metal salt of hypophosphorous (phosphinic) acid and at least one organohalogen flame retardant. A further aspect of the invention is the flame retardant composition itself and together with a polymer. The present invention also relates to polymeric articles (e.g. moldings, films, fibers, etc.) that are stabilized against light, heat and oxygen and made flame retardant by incorporation of at least one sterically hindered N-alkoxy amine, at least a metal salt of hypophosphorous acid (phosphinic acid) and at least one organo-halogen flame retardant.

The synergistic flame retardant mixtures achieve the desired flame retardancy (e.g. UL94-V rating) at very low loading levels compared to conventional systems such as brominated flame retardants in combination with antimony oxide. When the instant composition is added to conventional flame retardants, the total amount needed to achieve a certain level of flame retardancy can be significantly lowered. As a result, mechanical properties and long term stability increase. The inventive additive mixtures are especially useful for polyolefin applications.

Several attempts have been made to improve flame retardance with new additives or additive combinations. U.S. Pat. No. 5,393,812 describes polyolefin compositions which are made flame retardant by addition of a halogenated hydrocarbyl phosphate or phosphonate ester and are stabilized against degradation by UV-light with an alkoxyamine functional hindered amine. EP-A-792911 proposes the use of an alkoxyamine functional hindered amine for improving the flame retardant properties of a polyolefin. The activity of alkoxyamine functional hindered amines alone as flame retardants is disclosed in WO 99/00450.

However, there is still a need for flame retardant systems with improved properties that can be used in different polymer substrates. Especially increased safety regulations and legislative activities are the reason why known flame retardant systems do no longer match all necessary requirements. Halogen free or halogen reduced flame retardant formulations are preferred for environmental reasons and also due to their better performance in terms of smoke density associated with fire. Improved thermal stability and less corrosive behaviour are further benefits of halogen free or halogen reduced flame retardant solutions.

In contrast to previously described synrergistic mixtures of sterically hindered amines and brominated flame retardants (e.g. WO04/035673) where only the amount of antimony oxide could be reduced or eliminated, the synergistic mixtures of the present invention work at very low concentrations and allow to reduce or eliminate the content of antimony oxide and of brominated flame retardant.

It has been surprisingly found that polymers with excellent flame retardant properties are achieved when a synergistice mixture of a sterically hindered N-alkoxy amine, a metal salt of hypophosphorous acid and a organo-halogen flame retardant is used. Moreover, burning times and flaming dripping during the application of fire is significantly reduced.

By using these novel flame retardant compositions, halogen containing flame retardants, antimony compounds and fillers may be largely reduced or replaced.

One aspect of the invention is a composition comprising
a) a thermoplastic or elastomeric polymer;
b) at least one sterically hindered N-alkoxy amine;
c) at least one metal salt of hypophosphorous acid; and
d) at least one brominated flame retardant.

Suitable thermoplastic or elastomeric polymers are given below.

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultra-high molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or α-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is gene-rated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethyllene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; where atactic polymers are preferred. Stereoblock polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

19. Polycarbonates and polyester carbonates.

20. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

For example the thermoplastic polymer or elastomeric polymer is a polyolefin or a elastomer modified polyolefin (TPOs). Particularly suitable is polypropylene and (co)polymers of polypropylene.

Preferred is a composition wherein the thermoplastic or elastomeric polymer is a polyolefin or a copolymer of a polyolefin.

A specific embodiment is a composition wherein the hindered-alkoxyamine contains a structural element of formula (I)

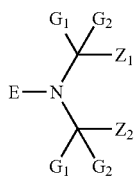

(I)

where $G_1$ and $G_2$ are independently alkyl of 1 to 8 carbon atoms or are together pentamethylene, $Z_1$ and $Z_2$ are each methyl, or $Z_1$ and $Z_2$ together form a linking moiety which may additionally be substituted by an ester, ether, amide, amino, carboxy or urethane group, and E is alkoxy of 1 to 18 carbon atoms, cycloalkoxy of 5 to 12 carbon atoms or aralkoxy of 7 to 15 carbon atoms, or E is a group —O—C(O)—$C_1$-$C_{18}$alkyl or —O-T-(OH)$_b$, T is a straight or branched chain alkylene of 1 to 18 carbon atoms, cycloalkylene of 5 to 18 carbon atoms, cycloalkenylene of 5 to 18 carbon atoms, a straight or branched chain alkylene of 1 to 4 carbon atoms substituted by phenyl or by phenyl substituted by one or two alkyl groups of 1 to 4 carbon atoms;

b is 1, 2 or 3 with the proviso that b cannot exceed the number of carbon atoms in T, and when b is 2 or 3, each hydroxyl group is attached to a different carbon atom of T.

E is for example alkoxy, cycloalkoxy or aralkoxy. For instance, E is methoxy, propoxy, cyclohexyloxy or octyloxy.

In another embodiment of the invention E is a group —O—C(O)—$C_1$-$C_{18}$alkyl, for example —O—C(O)—$CH_3$.

Preferred is a composition wherein the hindered-alkoxyamine contains a structural element of formula (Ia)

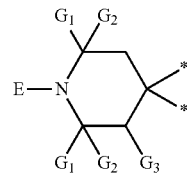

(Ia)

Wherein $G_1$, $G_2$, and E have the meanings as defined in claim 3, $G_3$ is hydrogen or methyl and

* is a valence.

For example E is alkoxy of 1 to 18 carbon atoms, cyclohexyloxy, or —O-T-(OH)$_b$, where b is 1 and T is $C_2$-$C_8$alkylene or cyclohexylene.

The present sterically hindered stabilizers of component (i) are for example of the formula A-R

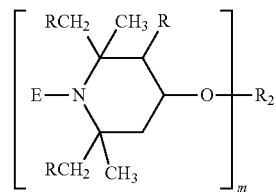

(A)

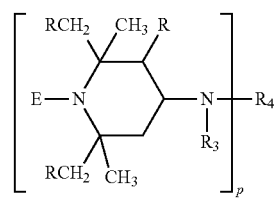

(B)

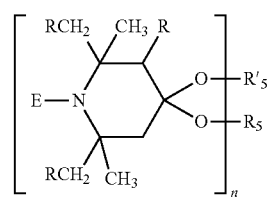

(C)

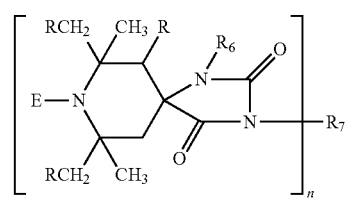

(D)

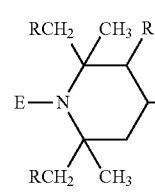

(E)

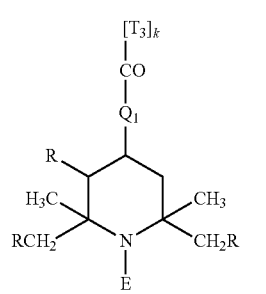
(F)

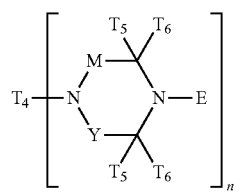
(G)

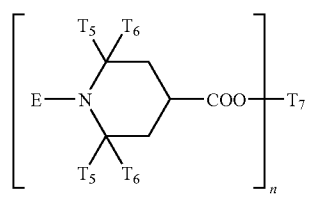
(H)

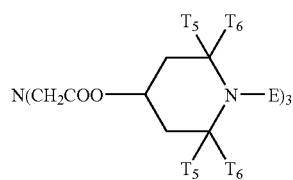
(I)

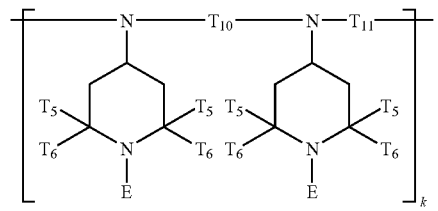
(J)

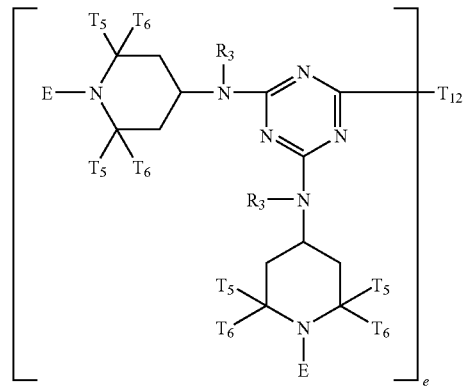
(K)

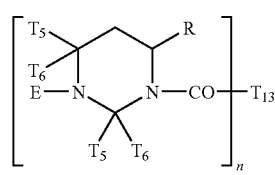
(L)

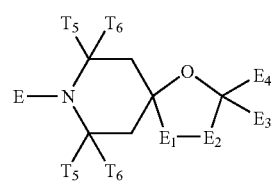
(M)

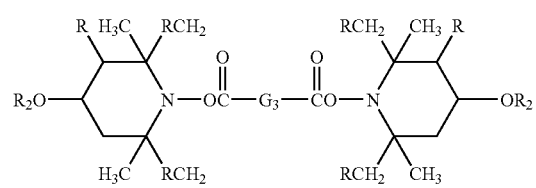
(N)

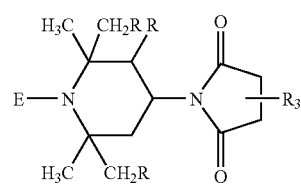
(O)

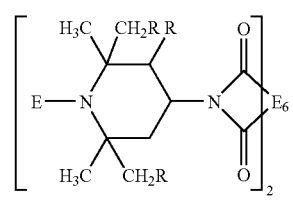
(P)

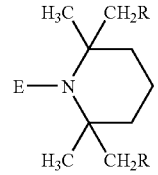
(Q)

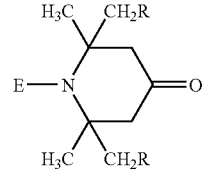
(R)

wherein

E is alkoxy of 1 to 18 carbon atoms, cycloalkoxy of 5 to 12 carbon atoms or aralkoxy of 7 to 15 carbon atoms, or E is —O-T-(OH)$_b$, T is a straight or branched chain alkylene of 1 to 18 carbon atoms, cycloalkylene of 5 to 18 carbon atoms, cycloalkenylene of 5 to 18 carbon atoms, a straight or branched chain alkylene of 1 to 4 carbon atoms substituted by phenyl or by phenyl substituted by one or two alkyl groups of 1 to 4 carbon atoms;

b is 1, 2 or 3 with the proviso that b cannot exceed the number of carbon atoms in T, and when b is 2 or 3, each hydroxyl group is attached to a different carbon atoms of T;

R is hydrogen or methyl, m is 1 to 4, when m is 1, $R_2$ is hydrogen, $C_1$-$C_{18}$alkyl or said alkyl optionally interrupted by one or more oxygen atoms, $C_2$-$C_{12}$alkenyl, $C_6$-$C_{10}$aryl, $C_7$-$C_{18}$aralkyl, glycidyl, a monovalent acyl radical of an aliphatic, cycloaliphatic or aromatic carboxylic acid, or a carbamic acid, for example an acyl radical of an aliphatic carboxylic acid having 2-18 C atoms, of a cycloaliphatic carboxylic acid having 5-12 C atoms or of an aromatic carboxylic acid having 7-15 C atoms, or

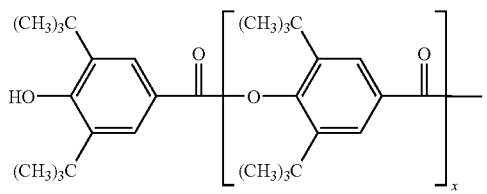

wherein x is 0 or 1,

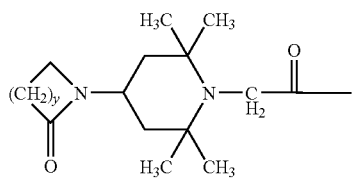

wherein y is 2-4;

when m is 2, $R_2$ is $C_1$-$C_{12}$alkylene, $C_4$-$C_{12}$alkenylene, xylylene, a divalent acyl radical of an aliphatic, cycloaliphatic, araliphatic or aromatic dicarboxylic acid or of a dicarbamic acid, for example an acyl radical of an aliphatic dicarboxylic acid having 2-18 C atoms, of a cycloaliphatic or aromatic dicarboxylic acid having 8-14 C atoms, or of an aliphatic, cycloaliphatic or aromatic dicarbamic acid having 8-14 C atoms;

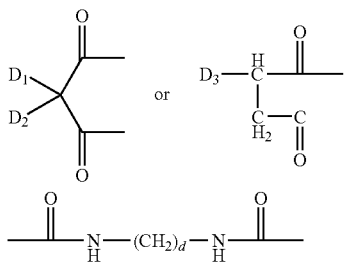

wherein $D_1$ and $D_2$ are independently hydrogen, an alkyl radical containing up to 8 carbon atoms, an aryl or aralkyl radical including 3,5-di-t-butyl-4-hydroxybenzyl radical, $D_3$ is hydrogen, or an alkyl or alkenyl radical containing up to 18 carbon atoms, and d is 0-20;

when m is 3, $R_2$ is a trivalent acyl radical of an aliphatic, unsaturated aliphatic, cycloaliphatic, or aromatic tricarboxylic acid;

when m is 4, $R_2$ is a tetravalent acyl radical of a saturated or unsaturated aliphatic or aromatic tetracarboxylic acid including 1,2,3,4-butanetetracarboxylic acid, 1,2,3,4-but-2-enetetracarboxylic, and 1,2,3,5- and 1,2,4,5-pentanetetracarboxylic acid;

p is 1, 2 or 3, $R_3$ is hydrogen, $C_1$-$C_{12}$alkyl, $C_5$-$C_7$cycloalkyl, $C_7$-$C_9$aralkyl, $C_2$-$C_{18}$alkanoyl, $C_3$-$C_5$alkenoyl or benzoyl;

when p is 1, $R_4$ is hydrogen, $C_1$-$C_{18}$alkyl, $C_5$-$C_7$cycloalkyl, $C_2$-$C_8$alkenyl, unsubstituted or substituted by a cyano, carbonyl or carbamide group, aryl, aralkyl, or it is glycidyl, a group of the formula —$CH_2$—CH(OH)—Z or of the formula —CO—Z or —CONH—Z wherein Z is hydrogen, methyl or phenyl; or a group of the formulae

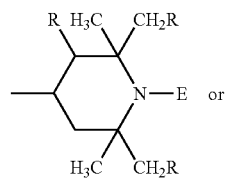

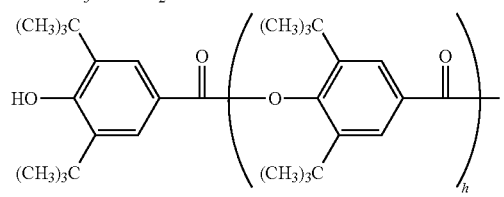

where h is 0 or 1, $R_3$ and $R_4$ together, when p is 1, can be alkylene of 4 to 6 carbon atoms or 2-oxo-polyalkylene the cyclic acyl radical of an aliphatic or aromatic 1,2- or 1,3-dicarboxylic acid, when p is 2, $R_4$ is a direct bond or is $C_1$-$C_{12}$alkylene, $C_6$-$C_{12}$arylene, xylylene, a —$CH_2$CH(OH)—$CH_2$ group or a group —$CH_2$—CH(OH)—$CH_2$—O—X—O—$CH_2$—CH(OH)—$CH_2$— wherein X is $C_2$-$C_{10}$alkylene, $C_6$-$C_{15}$arylene or $C_6$-$C_{12}$cycloalkylene; or, provided that $R_3$ is not alkanoyl, alkenoyl or benzoyl, $R_4$ can also be a divalent acyl radical of an aliphatic, cycloaliphatic or aromatic dicarboxylic acid or dicarbamic acid, or can be the group —CO—; or $R_4$ is

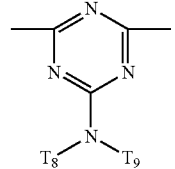

where $T_8$ and $T_9$ are independently hydrogen, alkyl of 1 to 18 carbon atoms, or $T_8$ and $T_9$ together are alkylene of 4 to 6 carbon atoms or 3-oxapentamethylene, for instance $T_8$ and $T_9$ together are 3-oxapentamethylene;

when p is 3, $R_4$ is 2,4,6-triazinyl, n is 1 or 2, when n is 1, $R_5$ and $R'_5$ are independently $C_1$-$C_{12}$ alkyl, $C_2$-$C_{12}$ alkenyl, $C_7$-$C_{12}$ aralkyl, or $R_5$ is also hydrogen, or $R_5$ and $R'_5$ together are $C_2$-$C_8$alkylene or hydroxyalkylene or $C_4$-$C_{24}$acyloxyalkylene;

when n is 2,
R$_5$ and R'$_5$ together are (—CH$_2$)$_2$C(CH$_2$—)$_2$;
R$_6$ is hydrogen, C$_1$-C$_{12}$alkyl, allyl, benzyl, glycidyl or C$_2$-C$_6$alkoxyalkyl;
when n is 1,
R$_7$ is hydrogen, C$_1$-C$_{12}$alkyl, C$_3$-C$_5$alkenyl, C$_7$-C$_8$aralkyl, C$_5$-C$_7$cycloalkyl, C$_2$-C$_4$hydroxyalkyl, C$_2$-C$_8$alkoxyalkyl, C$_6$-C$_{10}$ aryl, glycidyl, a group of the formula —(CH$_2$)$_t$—COO-Q or of the formula —(CH$_2$)$_t$—O—CO-Q wherein t is 1 or 2, and Q is C$_1$-C$_4$alkyl or phenyl; or
when n is 2,
R$_7$ is C$_2$-C$_{12}$alkylene, C$_6$-C$_{12}$arylene, a group —CH$_2$CH(OH)—CH$_2$—O—X—O—CH$_2$—CH(OH)—CH$_2$— wherein X is C$_2$-C$_{10}$alkylene, C$_6$-C$_{15}$arylene or C$_6$-C$_{12}$cycloalkylene, or a group —CH$_2$CH(OZ')CH$_2$—(OCH$_2$—CH(OZ')CH$_2$)$_2$— wherein Z' is hydrogen, C$_1$-C$_{18}$alkyl, allyl, benzyl, C$_2$-C$_{12}$alkanoyl or benzoyl;
Q$_1$ is —N(R$_8$)— or —O—; E$_7$ is C$_1$-C$_3$ alkylene, the group —CH$_2$—CH(R$_8$)—O— wherein R$_9$ is hydrogen, methyl or phenyl, the group —(CH$_2$)$_3$—NH— or a direct bond;
R$_{10}$ is hydrogen or C$_1$-C$_{18}$ alkyl, R$_8$ is hydrogen, C$_1$-C$_{18}$alkyl, C$_5$-C$_7$cycloalkyl, C$_7$-C$_{12}$aralkyl, cyanoethyl, C$_6$-C$_{10}$aryl, the group —CH$_2$—CH(R$_9$)—OH wherein R$_9$ has the meaning defined above; a group of the formula

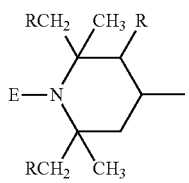

or a group of the formula

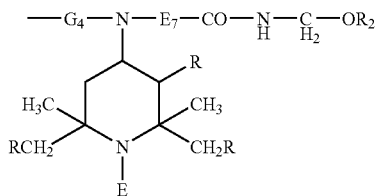

wherein G$_4$ is C$_2$-C$_6$alkylene or C$_6$-C$_{12}$arylene; or R$_8$ is a group -E$_7$-CO—NH—CH$_2$—OR$_{10}$;
Formula F denotes a recurring structural unit of a polymer where T$_3$ is ethylene or 1,2-propylene, is the repeating structural unit derived from an alpha-olefin copolymer with an alkyl acrylate or methacrylate; for example a copolymer of ethylene and ethyl acrylate, and where k is 2 to 100;
T$_4$ has the same meaning as R$_4$ when p is 1 or 2,
T$_5$ is methyl,
T$_6$ is methyl or ethyl, or T$_5$ and T$_6$ together are tetramethylene or pentamethylene, for instance T$_5$ and T$_6$ are each methyl,
M and Y are independently methylene or carbonyl, and T$_4$ is ethylene where n is 2;
T$_7$ is the same as R$_7$, and T$_7$ is for example octamethylene where n is 2,
T$_{10}$ and T$_{11}$ are independently alkylene of 2 to 12 carbon atoms, or T$_{11}$ is

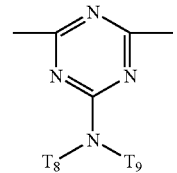

T$_{12}$ is piperazinyl,

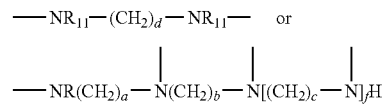

where R$_{11}$ is the same as R$_3$ or is also

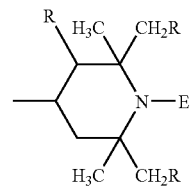

a, b and c are independently 2 or 3, and f is 0 or 1, for instance a and c are each 3, b is 2 and f is 1; and
e is 2, 3 or 4, for example 4;
T$_{13}$ is the same as R$_2$ with the proviso that T$_{13}$ cannot be hydrogen when n is 1;
E$_1$ and E$_2$, being different, each are —CO— or —N(E$_5$)- where E$_5$ is hydrogen, C$_1$-C$_{12}$ alkyl or C$_4$-C$_{24}$ alkoxycarbonylalkyl, for instance E$_1$ is —CO— and E$_2$ is —N(E$_5$)-,
E$_3$ is hydrogen, alkyl of 1 to 30 carbon atoms, phenyl, naphthyl, said phenyl or said naphthyl substituted by chlorine or by alkyl of 1 to 4 carbon atoms, or phenylalkyl of 7 to 12 carbon atoms, or said phenylalkyl substituted by alkyl of 1 to 4 carbon atoms,
E$_4$ is hydrogen, alkyl of 1 to 30 carbon atoms, phenyl, naphthyl or phenylalkyl of 7 to 12 carbon atoms, or
E$_3$ and E$_4$ together are polymethylene of 4 to 17 carbon atoms, or said polymethylene substituted by up to four alkyl groups of 1 to 4 carbon atoms, for example methyl,
E$_6$ is an aliphatic or aromatic tetravalent radical,
R$_2$ of formula (N) is a previously defined when m is 1;
G$_1$ a direct bond, C$_1$-C$_{12}$ alkylene, phenylene or —NH-G'—NH wherein G' is C$_1$-C$_{12}$ alkylene; or
wherein the hindered amine compound is a compound of the formula I, II, III, IV, V, VI, VII, VIII, IX, X or XI

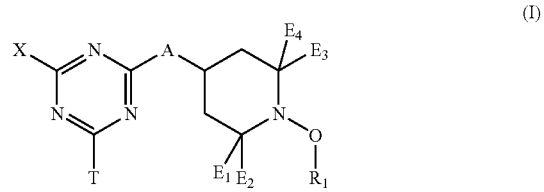

(I)

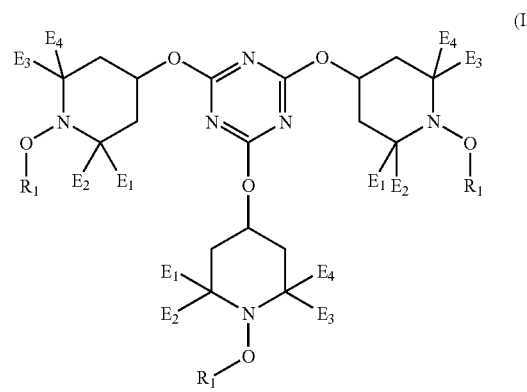
(Ia)
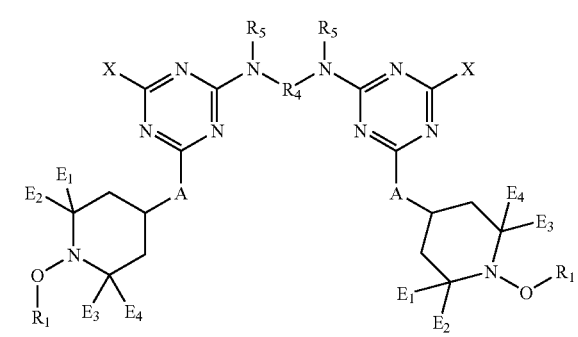
(VI)
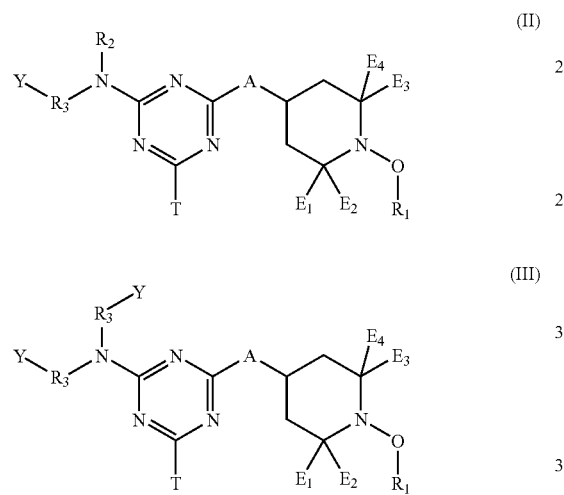
(II)
(III)
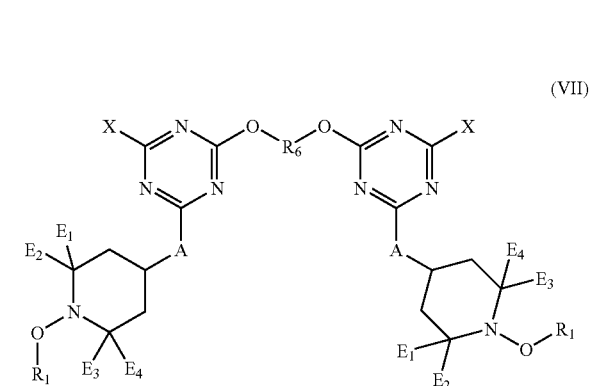
(VII)
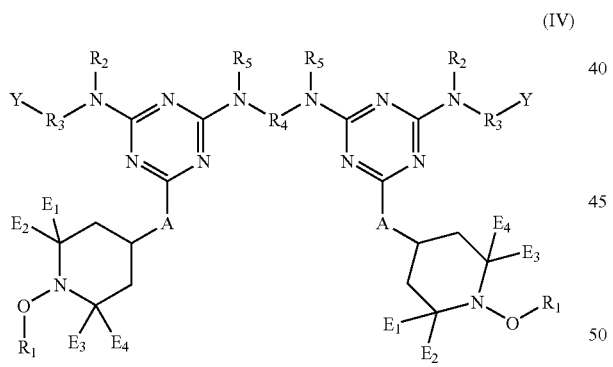
(IV)
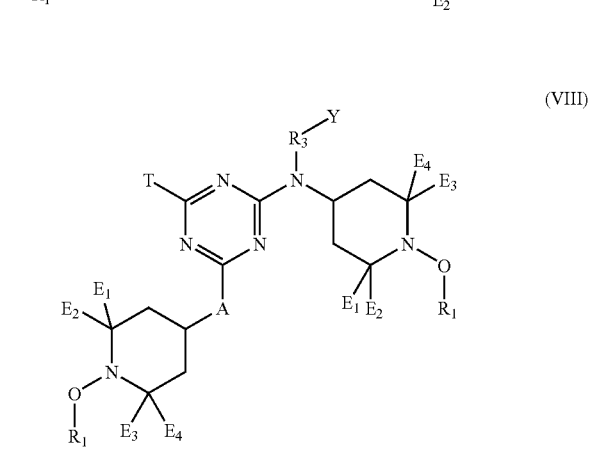
(VIII)
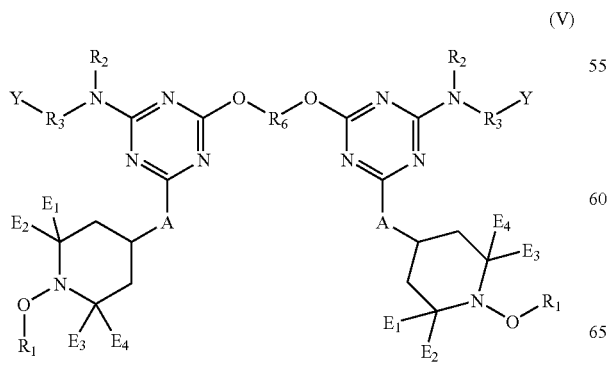
(V)
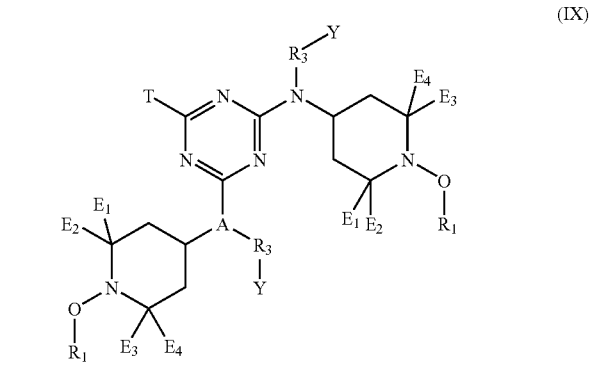
(IX)

-continued

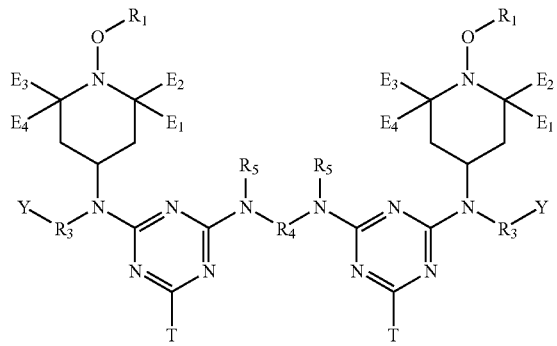
(X)

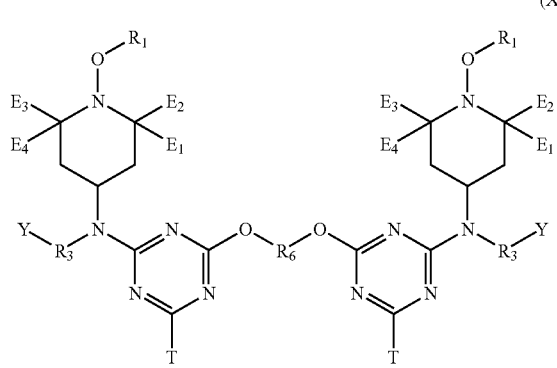
(XI)

wherein

E$_1$, E$_2$, E$_3$ and E$_4$ are independently alkyl of 1 to 4 carbon atoms, or E$_1$ and E$_2$ are independently alkyl of 1 to 4 carbon atoms and E$_3$ and E$_4$ taken together are pentamethylene, or E$_1$ and E$_2$; and E$_3$ and E$_4$ each taken together are pentamethylene, R$_1$ is alkyl of 1 to 18 carbon atoms, cycloalkyl of 5 to 12 carbon atoms, a bicyclic or tricyclic hydrocarbon radical of 7 to 12 carbon atoms, phenylalkyl of 7 to 15 carbon atoms, aryl of 6 to 10 carbon atoms or said aryl substituted by one to three alkyl of 1 to 8 carbon atoms, R$_2$ is hydrogen or a linear or branched chain alkyl of 1 to 12 carbon atoms, R$_3$ is alkylene of 1 to 8 carbon atoms, or R$_3$ is —CO—, —CO—R$_4$—, —CONR$_2$—, or —CO—NR$_2$—R$_4$—, R$_4$ is alkylene of 1 to 8 carbon atoms, R$_5$ is hydrogen, a linear or branched chain alkyl of 1 to 12 carbon atoms, or

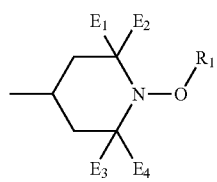

or when R$_4$ is ethylene, two R$_5$ methyl substituents can be linked by a direct bond so that the triazine bridging group —N(R$_5$)—R$_4$—N(R$_5$)— is a piperazin-1,4-diyl moiety, R$_6$ is alkylene of 2 to 8 carbon atoms or R$_6$ is

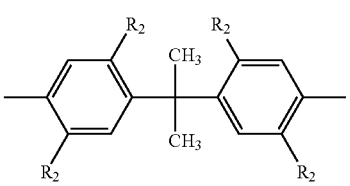

with the proviso that Y is not —OH when R$_6$ is the structure depicted above,

A is —O— or —NR$_7$— where R$_7$ is hydrogen, a straight or branched chain alkyl of 1 to 12 carbon atoms, or R$_7$ is

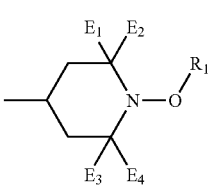

T is phenoxy, phenoxy substituted by one or two alkyl groups of 1 to 4 carbon atoms, alkoxy of 1 to 8 carbon atoms or —N(R$_2$)$_2$ with the stipulation that R$_2$ is not hydrogen, or T is

X is —NH$_2$, —NCO, —OH, —O-glycidyl, or —NHNH$_2$, and

Y is —OH, —NH$_2$, —NHR$_2$ where R$_2$ is not hydrogen; or Y is —NCO, —COOH, oxiranyl, —O— glycidyl, or —Si(OR$_2$)$_3$; or the combination R$_3$—Y— is —CH$_2$CH(OH)R$_2$ where R$_2$ is alkyl or said alkyl interrupted by one to four oxygen atoms, or R$_3$—Y— is —CH$_2$OR$_2$;

or wherein the hindered amine compound is a mixture of N,N',N'''-tris{2,4-bis[(1-hydrocarbyloxy-2,2,6,6-tetramethylpiperidin-4-yl)alkylamino]-s-triazin-6-yl}-3,3'-ethylenediiminodipropylamine; N,N',N''-tris{2,4-bis[(1-hydrocarbyloxy-2,2,6,6-tetramethylpiperidin-4-yl)alkylamino]-s-triazin-6-yl}-3,3'-ethylenediiminodipropylamine, and bridged derivatives as described by formulas I, II, IIA and III R$_1$NH—CH$_2$CH$_2$CH$_2$NR$_2$CH$_2$CH$_2$NR$_3$CH$_2$CH$_2$CH$_2$NHR$_4$    (I)

T-E$_1$-T$_1$    (II)

T-E$_1$    (IIA)

G-E$_1$-G$_1$-E$_1$-G$_2$    (III)

where in the tetraamine of formula I

R$_1$ and R$_2$ are the s-triazine moiety E; and one of R$_3$ and R$_4$ is the s-triazine moiety E with the other of R$_3$ or R$_4$ being hydrogen, E is

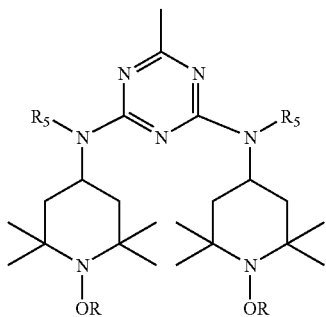

R is methyl, propyl, cyclohexyl or octyl, for instance cyclohexyl, $R_5$ is alkyl of 1 to 12 carbon atoms, for example n-butyl, where in the compound of formula II or IIA when R is propyl, cyclohexyl or octyl, T and $T_1$ are each a tetraamine substituted by $R_1$-$R_4$ as is defined for formula I, where (1) one of the s-triazine moieties E in each tetraamine is replaced by the group $E_1$ which forms a bridge between two tetraamines T and $T_1$, $E_1$ is

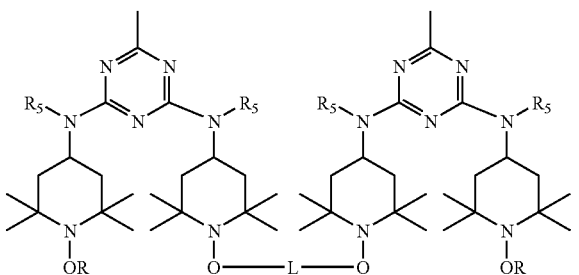

or (2) the group $E_1$ can have both termini in the same tetraamine T as in formula IIA where two of the E moieties of the tetraamine are replaced by one $E_1$ group, or (3) all three s-triazine substituents of tetraamine T can be $E_1$ such that one $E_1$ links T and $T_1$ and a second $E_1$ has both termini in tetraamine T, L is propanediyl, cyclohexanediyl or octanediyl;

where in the compound of formula III

G, $G_1$ and $G_2$ are each tetraamines substituted by $R_1$-$R_4$ as defined for formula I, except that G and $G_2$ each have one of the s-triazine moieties E replaced by $E_1$, and $G_1$ has two of the triazine moieties E replaced by $E_1$, so that there is a bridge between G and $G_1$ and a second bridge between $G_1$ and $G_2$;

which mixture is prepared by reacting two to four equivalents of 2,4-bis[(1-hydrocarbyloxy-2,2,6,6-tetramethylpiperidin-4-yl)butylamino]-6-chloro-s-triazine with one equivalent of N,N'-bis(3-aminopropyl)ethylenediamine;

or the hindered amine is a compound of the formula IIIb

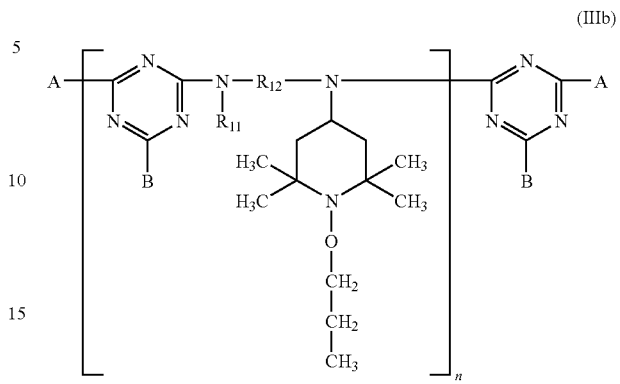

in which the index n ranges from 1 to 15;

$R_{12}$ is $C_2$-$C_{12}$alkylene, $C_4$-$C_{12}$alkenylene, $C_5$-$C_7$cycloalkylene, $C_5$-$C_7$cycloalkylene-di($C_1$-$C_4$alkylene), $C_1$-$C_4$alkylenedi($C_5$-$C_7$cycloalkylene), phenylenedi($C_1$-$C_4$alkylene) or $C_4$-$C_{12}$alkylene interrupted by 1,4-piperazinediyl, —O— or >N—$X_1$ with $X_1$ being $C_1$-$C_{12}$acyl or ($C_1$-$C_{12}$alkoxy)carbonyl or having one of the definitions of $R_{14}$ given below except hydrogen; or $R_{12}$ is a group of the formula (Ib') or (Ic');

$$—CH_2—CH—CH_2— \atop {\underset{X_2}{\underset{|}{\underset{C=O}{\underset{|}{O}}}}}$$ (Ib')

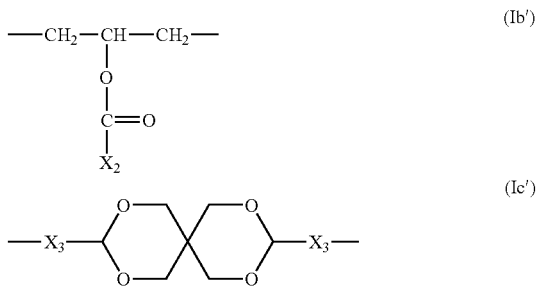

with $X_2$ being $C_1$-$C_{18}$alkyl, $C_5$-$C_{12}$cycloalkyl which is unsubstituted or substituted by 1, 2 or 3 $C_1$-$C_4$alkyl; phenyl which is unsubstituted or substituted by 1, 2 or 3 $C_1$-$C_4$alkyl or $C_1$-$C_4$alkoxy; $C_7$-$C_9$phenylalkyl which is unsubstituted or substituted on the phenyl by 1, 2 or 3 $C_1$-$C_4$alkyl; and the radicals $X_3$ being independently of one another $C_2$-$C_{12}$alkylene;

$R_{13}$, $R_{14}$ and $R_{15}$, which are identical or different, are hydrogen, $C_1$-$C_{18}$alkyl, $C_5$-$C_{12}$cycloalkyl which is unsubstituted or substituted by 1, 2 or 3 $C_1$-$C_4$alkyl; $C_3$-$C_{18}$alkenyl, phenyl which is unsubstituted or substituted by 1, 2 or 3 $C_1$-$C_4$alkyl or $C_1$-$C_4$alkoxy; $C_7$-$C_9$phenylalkyl which is unsubstituted or substituted on the phenyl by 1, 2 or 3 $C_1$-$C_4$alkyl; tetrahydrofurfuryl or $C_2$-$C_4$alkyl which is substituted in the 2, 3 or 4 position by —OH, $C_1$-$C_8$alkoxy, di($C_1$-$C_4$alkyl)amino or a group of the formula (Ie');

with Y being —O—, —$CH_2$—, —$CH_2CH_2$— or >N—$CH_3$, or —N(R$_{14}$)(R$_{15}$) is additionally a group of the formula (Ie');

the radicals A are independently of one another —OR$_{13}$, —N(R$_{14}$)(R$_{15}$) or a group of the formula (IIId);

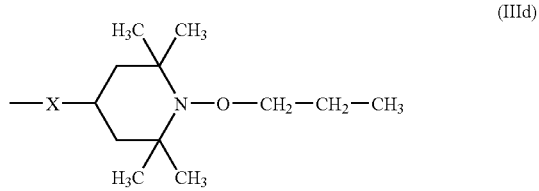
(IIId)

X is —O— or >N—R$_{16}$;

R$_{16}$ is hydrogen, C$_1$-C$_{18}$alkyl, C$_3$-C$_{18}$alkenyl, C$_5$-C$_{12}$cycloalkyl which is unsubstituted or substituted by 1, 2 or 3 C$_1$-C$_4$alkyl; C$_7$-C$_9$phenylalkyl which is unsubstituted or substituted on the phenyl by 1, 2 or 3 C$_1$-C$_4$alkyl; tetrahydrofurfuryl, a group of the formula (IIIf),

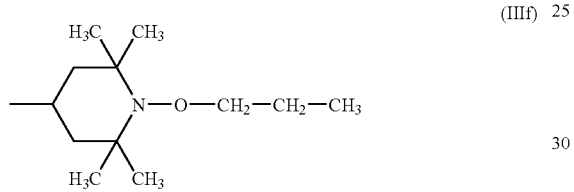
(IIIf)

or C$_2$-C$_4$alkyl which is substituted in the 2, 3 or 4 position by —OH, C$_1$-C$_8$alkoxy, di(C$_1$-C$_4$alkyl)amino or a group of the formula (Ie');

R$_{11}$ has one of the definitions given for R$_{16}$; and the radicals B have independently of one another one of the definitions given for A.

Alkyl is straight or branched and is for example methyl, ethyl, n-propyl, n-butyl, sec-butyl, tert-butyl, n-hexyl, n-octyl, 2-ethylhexyl, n-nonyl, n-decyl, n-undecyl, n-dodecyl, n-tridecyl, n-tetradecyl, n-hexadecyl or n-octadecyl.

Cycloalkyl groups include cyclopentyl and cyclohexyl; typical cycloalkenyl groups include cyclohexenyl; while typical aralkyl groups include benzyl, alpha-methyl-benzyl, alpha,alpha-dimethylbenzyl or phenethyl.

Alkoxy and cycloalkoxy comprise the corresponding alkyl and cycloalkyl groups.

If R$_2$ is a monovalent acyl radical of a carboxylic acid, it is for example an acyl radical of acetic acid, stearic acid, salicyclic acid, benzoic acid or β-(3,5-di-tert-butyl-4-hydroxyphenyl) propionic acid.

If R$_2$ is a divalent acyl radical of a dicarboxylic acid, it is for example an acyl radical of oxalic acid, adipic acid, succinic acid, suberic acid, sebacic acid, phthalic acid dibutylmalonic acid, dibenzylmalonic acid or butyl-(3,5-di-tert-butyl-4-hydropxybenzyl)-malonic acid, or bicycloheptenedicarboxylic acid, with succinates, sebacates, phthalates and isophthalates being specific examples.

If R$_2$ is a divalent acyl radical of a dicarbamic acid, it is for example an acyl radical of hexamethylenedicarbamic acid or of 2,4-toluoylenedicarbamic acid.

The hindered N-alkoxyamine compounds are well known in the art, also known as N-alkoxy hindered amines and NOR hindered amines or NOR hindered amine light stabilizers or NOR HALS.

They are disclosed for example in U.S. Pat. Nos. 5,004,770, 5,204,473, 5,096,950, 5,300,544, 5,112,890, 5,124,378, 5,145,893, 5,216,156, 5,844,026, 6,117,995, 6,271,377, and U.S. application Ser. No. 09/505,529, filed Feb. 17, 2000, 09/794,710, filed Feb. 27, 2001, 09/714,717, filed Nov. 16, 2000, 09/502,239, filed Nov. 3, 1999 and 60/312,517, filed Aug. 15, 2001. The relevant disclosures of these patents and applications are hereby incorporated by reference.

U.S. Pat. No. 6,271,377, and U.S. application Ser. No. 09/505,529, filed Feb. 17, 2000, and 09/794,710, filed Feb. 27, 2001, cited above disclose hindered hydroxyalkoxyamine stabilizers. Hindered hydroxyalkoxyamine stabilizers are also known as N-hydroxyalkoxy hindered amines, or NORol HALS.

Typical structures are the following:

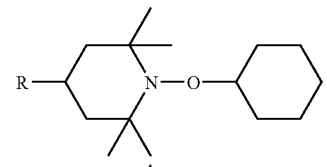

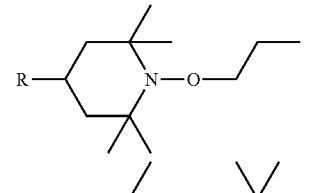

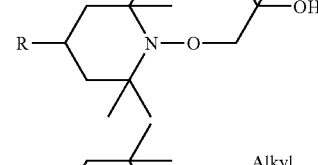

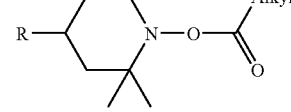

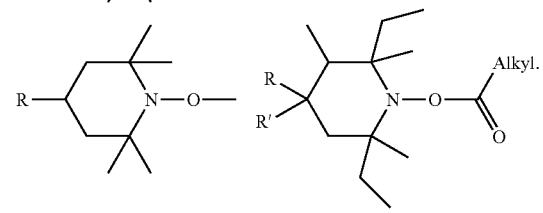

When the group E is —O—C(O)—C$_1$-C$_{18}$alkyl, the compounds are hydroxylamine esters. The preparation of hydroxylamine esters is, for example, disclosed in following U.S. Pat. Nos. 4,590,231, 5,300,647, 4,831,134, 5,204,473, 5,004,770, 5,096,950, 5,021,478, 5,118,736, 5,021,480, 5,015,683, 5,021,481, 5,019,613, 5,021,486, 5,021,483, 5,145,893, 5,286,865, 5,359,069, 4,983,737, 5,047,489, 5,077,340, 5,021,577, 5,189,086, 5,015,682, 5,015,678, 5,051,511, 5,140,081, 5,204,422, 5,026,750, 5,185,448, 5,180,829, 5,262,538, 5,371,125, 5,216,156, 5,300,544.

The hydroxylamines are reacted with a suitable acid derivative to form the final hydroxylamine ester. Such esterification processes are known and described in the chemical literature.

The preparation of particularly suitable compounds is described in the International Patent Application WO 01/90113.

Suitable N-alkoxyamines of component (b) include for example:

1-cyclohexyloxy-2,2,6,6-tetramethyl-4-octadecylaminopiperidine;
bis(1-octyloxy-2,2,6,6-tetramethylpiperidin-4-yl)sebacate;
2,4-bis[(1-cyclohexyloxy-2,2,6,6-tetramethylpiperidin-4-yl)butylamino]-6-(2-hydroxyethylamino-s-triazine;
bis(1-cyclohexyloxy-2,2,6,6-tetramethylpiperidin-4-yl)adipate;
2,4-bis[(1-cyclohexyloxy-2,2,6,6-tetramethylpiperidin-4-yl)butylamino]-6-chloro-s-triazine;
1-(2-hydroxy-2-methylpropoxy)-4-hydroxy-2,2,6,6-tetramethylpiperidine;
1-(2-hydroxy-2-methylpropoxy)-4-oxo-2,2,6,6-tetramethylpiperidine;
1-(2-hydroxy-2-methylpropoxy)-4-octadecanoyloxy-2,2,6,6-tetramethylpiperidine;
bis(1-(2-hydroxy-2-methylpropoxy)-2,2,6,6-tetramethylpiperidin-4-yl)sebacate;
bis(1-(2-hydroxy-2-methylpropoxy)-2,2,6,6-tetramethylpiperidin-4-yl)adipate;
2,4-bis{N-[1-(2-hydroxy-2-methylpropoxy)-2,2,6,6-tetramethylpiperidin-4-yl]-N-butylamino}-6-(2-hydroxyethylamino)-s-triazine;
the reaction product of 2,4-bis[(1-cyclohexyloxy-2,2,6,6-tetramethylpiperidin-4-yl)-butylamino]-6-chloro-s-triazine with N,N'-bis(3-aminopropyl)ethylenediamine);
2,4-bis[(1-cyclohexyloxy-2,2,6,6-tetramethylpiperidin-4-yl)butylamino]-6-(2-hydroxyethylamino-s-triazine;
the oligomeric compound which is the condensation product of 4,4'-hexamethylene-bis(amino-2,2,6,6-tetramethylpiperidine) and 2,4-dichloro-6-[(1-cyclohexyloxy-2,2,6,6-tetramethylpiperidin-4-yl)butylamino]-s-triazine end-capped with 2-chloro-4,6-bis(dibutylamino)-s-triazine; and
the compounds of formulae

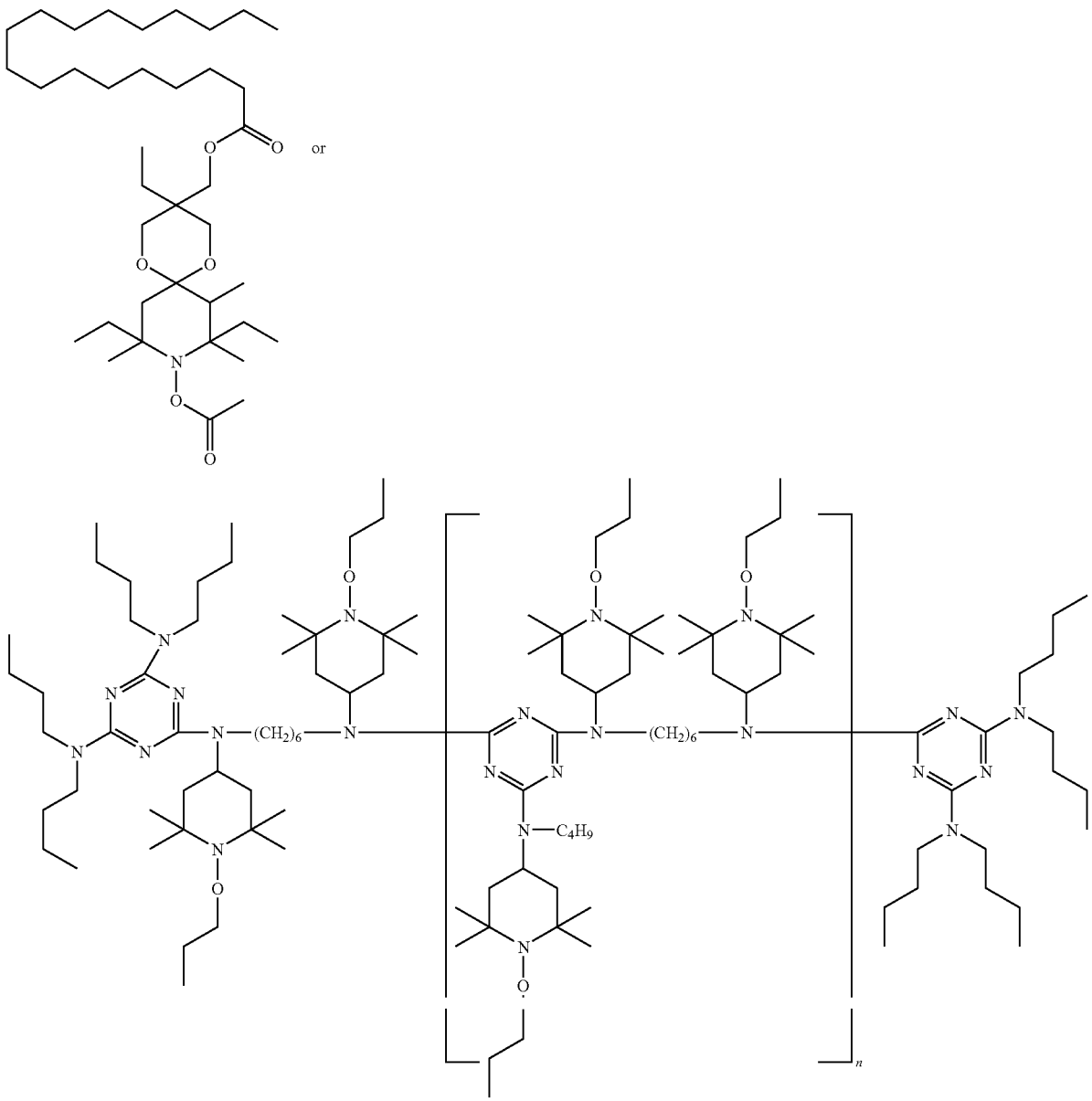

in which n is from 1 to 15. This compound is disclosed in example 2 of U.S. Pat. No. 6,117,995.

The above mentioned compounds are partly items of commerce and are marketed under the following trade names FLAMESTAB NOR 116®, TINUVIN NOR 371®, IRGAETEC CR 76® by Ciba Inc.

Preferably the metal salt of hypophosphorous acid is of formula (X)

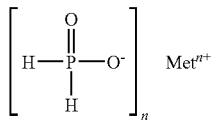

wherein Met is a metal selected from groups I, II, III or IV of the periodic table of elements; and n is a number from 1 to 4, corresponding to the charge of the metal ion.

For example $Met^{n+}$ is $Na^+$, $Ca^{2+}$, $Mg^{2+}$, $Zn^{2+}$, $Ti^{4+}$ or $Al^{3+}$.

The above mentioned hypophosphorous acid salts are partly commercially available. Preferred particle sizes of the metal salts are D50<50 μm and biggest particles<100 μm, more preferred are D50<15 and biggest particles 530 μm. Preferably without crystal water.

For example the brominated flame retardant is selected from the group consisting of polybrominated diphenyl oxide,
decabromodiphenyl oxide,
brominated hydrocarbyl phosphates or phosphonates,
tris[3-bromo-2,2-bis(bromomethyl)propyl]phosphate,
tris(tribromoneopentyl)phosphate
tris(2,3-dibromopropyl)phosphate
tetrabromophthalic acid,
bis(2,3-dibromopropyl ether) of tetrabromobisphenol A,
brominated epoxy resin,
ethylene-bis(tetrabromophthalimide),
octabromodiphenyl ether,
decabromodiphenyl ether,
1,2-bis(tribromophenoxy)ethane,
hexabromocycododecane,
brominated diphenylethane,
tetrabromo-bisphenol A,
tetrabromo bisphenol A-bis(dibromopropyl)ether,
ethylene bis-(dibromo-norbornanedicarboximide),
tris-(2,3-dibromopropyl)-isocyanurate,
ethylene-bis-tetrabromophthalimide, and
melamine hydrobromide.

These components are largely known in the art and commercially available, see, for example, Plastics Additives Handbook, Ed. by H. Zweifel, 5$^{th}$ Ed., Hanser Publ., Munich 2001, pp. 681-698.

Particularly preferred brominated flame retardants are:
Melamine hydrobromide, decabromodiphenylether, tris(tribromoneopentyl)phosphate, brominated diphenylethane, hexabromocyclododecane, tetrabromobisphenol-A-bis(dibromopropyl)ether.

Preferred is a composition wherein the N-alkoxyamine is present in an amount of from 0.02 to 1% by weight, based on the weight of the thermoplastic or elastomeric polymer, the metal salt of hypophosphorous acid is present in an amount of from 0.1 to 9% by weight, based on the weight of the thermoplastic or elastomeric polymer and the organobromine flame retardant is present in an amount of from 0.1 to 9% by weight, based on the weight of the thermoplastic or elastomeric polymer.

For example the ratio of the metal salt of hypophosphorous acid:organobrominated flame retardant is from 1:5 to 20:1; the ratio of the metal salt of hypophosphorous acid:N-alkoxyamine is from 2:1 to 100:1; and the ratio of organobrominated flame retardant:N-alkoxyamine is from 5:1 to 100:1.

The composition may comprise additionally an additive selected from the group consisting of a UV absorber, a sterically hindered light stabilizer, a phenolic antioxidant, a phosphite or phosphonite and a benzofuranone or indolinone.

Suitable additives are mentioned below.

1. Antioxidants 1.1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)-disulfide.

1.6. Alkylidenebisphenols, for example 2, 2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methyllenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3, 5,3', 5'-tetra-tert-butyl-4,4'-dihydroxydibenzyl ether, octadecyl-4- hydroxy-3,5-dimethyl benzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecylmercaptoethyl-2,2-bis(3,5-di-tert-butyl-4-hydroxybenzyl)malonate, bis[4-(1,1,3,3-tetramethylbutyl) phenyl]-2,2-bis(3,5-di-tert-butyl-4-hydroxybenzyl) malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethyl benzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.14. Esters of β-(5-tert-butyl-4-hydroxy-3-methylphenyl) propionic acid with mono- or poly-hydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl] propionyloxy)ethyl]oxamide (Naugard® XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis (4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino] ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyl-diphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene.

2. UV Absorbers and Light Stabilizers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl- 2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]$_2$, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]-benzotriazole; 2-[2'-hydroxy-3'-(1,1,3,3-tetramethylbutyl)-5'-(α,α-dimethylbenzyl)-phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-[3,6-d]phenylacrylate, isooctyl α-cyano-[3,6-d]phenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate, N-(β-carbomethoxy-β-cyanovinyl)-2-methylindoline, neopentyl tetra(α-cyano-β,β-di-phenylacrylate.

2.5. Nickel compounds, for example nickel complexes of 2,2'-thio-bis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexa-methylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydrooxy-2-methylpropoxy)-4-octadecanoyloxy-2,2,6,6-tetramethylpiperidine, 5-(2-ethylhexanoyl)-oxymethyl-3,3,5-trimethyl-2-morpholinone, Sanduvor (Clariant; CAS Reg. No. 106917-31-1], 5-(2-ethylhexanoyl)oxymethyl-3,3,5-trimethyl-2-morpholinone, the reaction product of 2,4-bis-[(1-cyclohexyloxy-2,2,6,6-piperidine-4-yl)butylamino]-6-chloro-s-triazine with N,N'-bis(3-aminopropyl) ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)-amino)-s-triazine.

2.7. Oxamides, for example 4, 4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1, 3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydrooxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl)phosphite, trilauryl phosphite, trioctadecyl phosphite, distearylpentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2"-nitrilo[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:

Tris(2,4-di-tert-butylphenyl) phosphite (Irgafos® 168, Ciba Specialty Chemicals Inc.), tris(nonylphenyl)phosphite, (A)

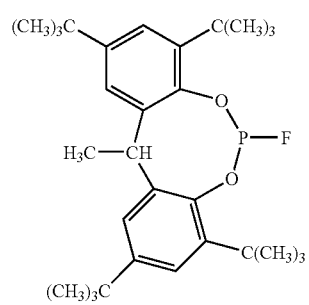

(B)

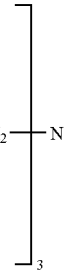

(C)

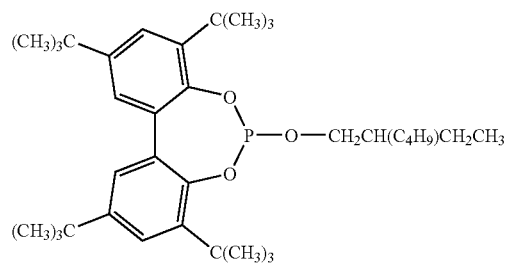

(D)

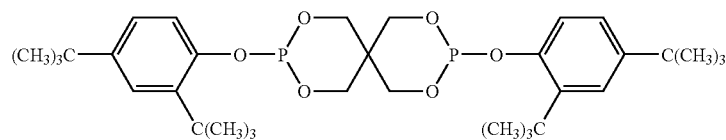

(E)

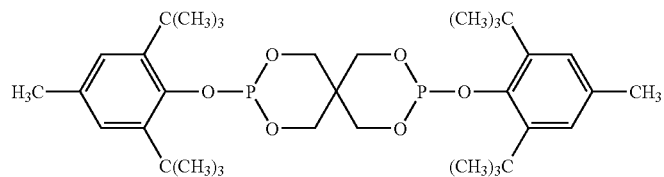

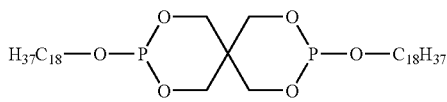 (F)

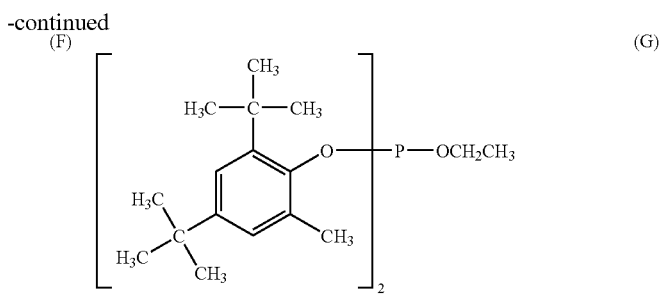 (G)

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Thiosynergists, for example dilauryl thiodipropionate, dimistryl thiodipropionate, distearyl thiodipropionate or distearyl disulfide.

7. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

8. Polyamide stabilizers, for example copper salts in combination with iodides and/or phosphorus compounds and salts of divalent manganese.

9. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

10. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.

11. Fillers and reinforcing agents, for example calcium carbonate, silicates, glass fibres, glass beads, asbestos, talc, kaolin, mica, barium sulfate, metal oxides and hydroxides, carbon black, graphite, wood flour and flours or fibers of other natural products, synthetic fibers.

12. Other additives, for example plasticisers, lubricants, emulsifiers, pigments, rheology additives, catalysts, flow-control agents, optical brighteners, antistatic agents and blowing agents.

13. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839, EP-A-0591102; EP-A-1291384 or 3-[4-(2-acetoxyethoxy)phenyl]-5,7-di-tert-butylbenzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one, 3-(2-acetyl-5-isooctylphenyl)-5-isooctylbenzofuran-2-one.

The further additives are typically present in an amount of 0.01% to 2% by weight, based on the weight of the thermoplastic or elastomeric polymer.

The composition may also be in the form of a thermoplastic or elastomeric masterbatch concentrate comprising the components b), c) and d) in a total amount of from 10% to 90% by weight, based on the total weight of the masterbatch.

A further aspect of the invention is a flame retardant composition comprising
a) at least one sterically hindered N-alkoxy amine;
b) at least one metal salt of hypophosphorous acid; and
c) at least one brominated flame retardant.

The addition of the additives of the invention and of further additives to the polymer can be carried out in all customary mixing machines in which the polymer is melted and mixed with the additives. Suitable machines are known to those skilled in the art. They are predominantly mixers, kneaders and extruders.

The mixing process is preferably carried out in an extruder by introducing the additive during processing.

Particularly preferred processing machines are single-screw extruders, contrarotating and corotating twin-screw extruders, planetary-gear extruders, ring extruders or cokneaders. It is also possible to use processing machines provided with at least one gas removal compartment to which a vacuum can be applied.

Suitable extruders and kneaders are described, for example, in *Handbuch der Kunststoffextrusion*, Vol. 1 Grundlagen, Editors F. Hensen, W. Knappe, H. Potente, 1989, pp. 3-7, ISBN:3-446-14339-4 (Vol. 2 *Extrusionsanlagen* 1986, ISBN 3-446-14329-7).

For example, the screw length is 1-60 screw diameters, preferably 35-48 screw diameters. The rotational speed of the screw is preferably 10-600 rotations per minute (rpm), very particularly preferably 25-300 rpm.

The maximum throughput is dependent on the screw diameter, the rotational speed and the driving force. The mixing and incorporating process of the present invention can also be carried out at a level lower than maximum throughput by varying the parameters mentioned or employing weighing machines delivering dosage amounts.

If a plurality of components is added, these can be premixed or added individually.

Also an aspect of the invention is a method for improving the flame retardancy of a thermoplastic or elastomeric polymer comprising incorporating into the thermoplastic or elastomeric polymer a composition comprising
a) at least one sterically hindered N-alkoxy amine;
b) at least one metal salt of hypophosphorous acid; and
c) at least one brominated flame retardant.

Yet a further aspect is the use of a composition comprising
a) at least one sterically hindered N-alkoxy amine;
b) at least one metal salt of hypophosphorous acid; and
c) at least one brominated flame retardant for increasing flame retardancy of thermoplastic or elastomeric polymers.

Typical applications for which the present invention can be used are in the electrical & electronic sectors, in pipes, in cables, in fibers and in building & construction fabricated by injection molding, compression molding, extrusion or blow-molding.

The definitions and preferences given for the composition apply equally for the other aspects of the invention.

The following examples illustrate the invention.

Components Used:
Polypropylene (PP): Moplen® HF500 N, commercial product from Basell, Germany.
Flamerphos® A (Al-hypophosphite, Compound 1): commercial product from Anan Drug & Chemicals, India.
Ca-hypophosphite (Ca-hypophosphite, Compound 2): Sigma-Aldrich Chemie GmbH, Germany.
FR-1210 (Decabromodiphenyloxide, Compound 3): commercial product from Eurobrom B.V., Netherlands.
FR-370 (Tris(tribromoneopentyl)phosphate, Compound 4): commercial product from Eurobrom B.V., Netherlands.
Melamine hydrobromide (Compound 5): Domus Chemicals S.p.a., Italy.
Campine PP 262815 (80% masterbatch of $Sb_2O_3$ in PP, Compound 6): commercial product from Campine N.V., Belgium.
Flamestab® NOR 116 (NOR 1): commercial product from Ciba Inc., Switzerland.
Tinuvin® NOR 371 (NOR 2): commercial product from Ciba Inc., Switzerland.
Irgatec® CR 76 (NOR 3): commercial product from Ciba Inc., Switzerland.

Test Methods to Assess Flame Retardancy:
UL94-V test for *"Flammability of Plastic Materials for Parts in Devices and Appliances"*, 5$^{th}$ edition, Oct. 29, 1996. Ratings according to the UL 94 V test are compiled in the following table (afterflame times are indicated for one specimen):

| Rating | Afterflame time | Burning drips | Burn to clamp |
|---|---|---|---|
| V-0 | <10 s | No | No |
| V-1 | <30 s | No | No |
| V-2 | <30 s | Yes | No |
| n.c. | <30 s |  | Yes |
| n.c. | >30 s |  | No |

Standard Procedure/Examples:
Unless stated otherwise, commercial polypropylene (Moplen® HF500 N) is extruded on a co-rotating twin-screw extruder ZSK25 from Coperion Werner & Pfleiderer at a temperature of $T_{max}$=230° C. (heating zones 1-6), a throughput rate of 4 kg/h and 100 rpm under addition of basic-level stabilization (0.3% IRGANOX B225+0.05% Ca-stearate, IRGANOX B225 is a 1:1 mixture of IRGAFOS 168 and IRGANOX 1010) and the additives indicated in Tables 1 and 2.

After cooling in a water bath the polymer strand is granulated. Test specimens are prepared by injection molding (bars 125×12.5 mm according to UL94-V, thickness=1.6 mm, Arburg 370S, 225° C.).

The test samples are investigated for flame retardancy in accordance with UL94-V.

Comp. means comparative example, invent. means inventive example.

TABLE 1

PP formulations based on FLAMESTAB NOR 116, melamine hydrobromide and hypophosphites.

| Example | FR Additives | UL 94 rating, 1.6 mm | Total burning time/[s] |
|---|---|---|---|
| Comp. 1 | w/o | n.c. | 470 |
| Comp. 2 | 22% Compound 3 + 9.5% Compound 6 | n.c. | 157 |
| Comp. 3 | 1% NOR 1 | n.c. | 490 |
| Comp. 4 | 5% Compound 1 | n.c. | 505 |
| Comp. 5 | 5% Compound 5 | n.c. | 480 |
| Comp. 6 | 2.5% Compound 1 + 2.5% Compound 5 | n.c. | 620 |
| Invent. 1 | 1% Compound 1 + 1% Compound 5 + 0.05% NOR 1 | V-2 | 72 |
| Invent. 2 | 1% Compound 1 + 1% Compound 5 + 0.1% NOR 1 | V-2 | 43 |
| Invent. 3 (DH2796) | 1% Compound 1 + 1% Compound 5 + 0.2% NOR 1 | V-2 | 21 |
| Invent. 4 | 1% Compound 1 + 1% Compound 5 + 0.5% NOR 1 | V-2 | 15 |
| Invent. 5 | 2.5% Compound 1 + 2.5% Compound 5 + 0.1% NOR 1 | V-2 | 43 |
| Invent. 6 | 1% Compound 2 + 1% Compound 5 + 0.1% NOR 1 | V-2 | 93 |

TABLE 2

PP formulations based on different NOR compounds, Aluminum hypophosphite and different brominated flame retardants

| Example | FR Additives | UL 94 rating, 1.6 mm | Total burning time/[s] |
|---|---|---|---|
| Comp. 1 | w/o | n.c. | 475 |
| Comp. 2 | 22% Compound 3 + 9.5% Compound 6 | n.c. | 157 |
| Comp. 3 | 6% Compound 3 | n.c. | 490 |
| Comp. 4 | 6% Compound 1 | n.c. | 390 |
| Comp. 5 | 3% Compound 1 + 3% Compound 3 | n.c. | 765 |
| Comp. 6 | 0.5% NOR 2 | n.c. | 600 |
| Comp. 7 | 6% Compound 3 + 0.3% NOR 2 | V-2 | 23 |
| Comp. 8 | 6% Compound 1 + 0.3% NOR 2 | V-2 | 17 |
| Invent. 1 | 3% Compound 1 + 3% Compound 3 + 3% NOR 3 | V-2 | 40 |
| Invent. 2 | 3% Compound 1 + 3% Compound 3 + 0.3% NOR 2 | V-0 | 10 |
| Invent. 3 | 3% Compound 1 + 3% Compound 4 + 0.25% NOR 2 | V-0 | 8 |

TABLE 2-continued

PP formulations based on different NOR compounds, Aluminum hypophosphite and different brominated flame retardants

| Example | FR Additives | UL 94 rating, 1.6 mm | Total burning time/[s] |
|---|---|---|---|
| Invent. 4 | 3% Compound 1 + 3% Compound 4 + 0.5% NOR 2 | V-0 | 7 |
| Invent. 5 | 5% Compound 1 + 1% Compound 4 + 0.25% NOR 2 | V-0 | 10 |

From the above results it can be seen that the formulations according to the present invention provide polymers with excellent flame retardancy and self-extinguishing properties. Further benefits of the present invention are improved mechanical properties due to low loading levels of flame retardants, resistance towards hydrolysis (leaching test) and improved stability towards actinic irradiation (presence of sterically hindered amine compounds).

The invention claimed is:

1. A composition comprising
   a) a thermoplastic or elastomeric polymer;
   b) at least one sterically hindered N-alkoxy amine;
   c) at least one metal salt of hypophosphorous acid; and
   d) at least one brominated flame retardant.

2. A composition according to claim 1 wherein the thermoplastic or elastomeric polymer is a polyolefin or a copolymer of a polyolefin.

3. A composition according to claim 1 wherein the hindered-alkoxyamine contains a structural element of formula (I)

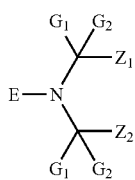

where
   $G_1$ and $G_2$ are independently alkyl of 1 to 8 carbon atoms or are together pentamethylene,
   $Z_1$ and $Z_2$ are each methyl, or $Z_1$ and $Z_2$ together form a linking moiety which may additionally be substituted by an ester, ether, amide, amino, carboxy or urethane group, and
   E is alkoxy of 1 to 18 carbon atoms, cycloalkoxy of 5 to 12 carbon atoms or aralkoxy of 7 to 15 carbon atoms, or E is a group —O—C(O)—$C_1$-$C_{18}$alkyl or —O-T-(OH)$_b$,
   T is a straight or branched chain alkylene of 1 to 18 carbon atoms, cycloalkylene of 5 to 18 carbon atoms, cycloalkenylene of 5 to 18 carbon atoms, a straight or branched chain alkylene of 1 to 4 carbon atoms substituted by phenyl or by phenyl substituted by one or two alkyl groups of 1 to 4 carbon atoms;
   b is 1, 2 or 3 with the proviso that b cannot exceed the number of carbon atoms in T, and when b is 2 or 3, each hydroxyl group is attached to a different carbon atom of T.

4. A composition according to claim 3 wherein the hindered-alkoxyamine contains a structural element of formula (Ia)

Wherein $G_1$, $G_2$, and E have the meanings as defined in claim 3, $G_3$ is hydrogen or methyl and
   * is a valence.

5. A composition according to claim 3 wherein E is alkoxy of 1 to 18 carbon atoms, cyclohexyloxy, or —O-T-(OH)$_b$, where b is 1 and T is $C_2$-$C_8$alkylene or cyclohexylene.

6. A composition according to claim 3 wherein the alkoxyamines of component (b) are selected from the group consisting of
   1-cyclohexyloxy-2,2,6,6-tetramethyl-4-octadecylaminopiperidine;
   bis(1-octyloxy-2,2,6,6-tetramethylpiperidin-4-yl) sebacate;
   2,4-bis[(1-cyclohexyloxy-2,2,6,6-tetramethylpiperidin-4-yl)butylamino]-6-(2-hydroxyethylamino-s-triazine;
   bis(1-cyclohexyloxy-2,2,6,6-tetramethylpiperidin-4-yl) adipate;
   2,4-bis[(1-cyclohexyloxy-2,2,6,6-tetramethylpiperidin-4-yl)butylamino]-6-chloro-s-triazine;
   1-(2-hydroxy-2-methylpropoxy)-4-hydroxy-2,2,6,6-tetramethylpiperidine;
   1-(2-hydroxy-2-methylpropoxy)-4-oxo-2,2,6,6-tetramethylpiperidine;
   1-(2-hydroxy-2-methylpropoxy)-4-octadecanoyloxy-2,2,6,6-tetramethylpiperidine;
   bis(1-(2-hydroxy-2-methylpropoxy)-2,2,6,6-tetramethylpiperidin-4-yl)sebacate;
   bis(1-(2-hydroxy-2-methylpropoxy)-2,2,6,6-tetramethylpiperidin-4-yl)adipate;
   2,4-bis{N-[1-(2-hydroxy-2-methylpropoxy)-2,2,6,6-tetramethylpiperidin-4-yl]-N-butylamino}-6-(2-hydroxyethylamino)-s-triazine;
   the reaction product of 2,4-bis[(1-cyclohexyloxy-2,2,6,6-tetramethylpiperidin-4-yl)-butylamino]-6-chloro-s-triazine with N,N'-bis(3-aminopropyl)ethylenediamine);
   2,4-bis[(1-cyclohexyloxy-2,2,6,6-tetramethylpiperidin-4-yl)butylamino]-6-(2-hydroxyethylamino-s-triazine;
   the oligomeric compound which is the condensation product of 4,4'-hexamethylene-bis(amino-2,2,6,6-tetramethylpiperidine) and 2,4-dichloro-6-[(1-cyclohexyloxy-2,2,6,6-tetramethylpiperidin-4-yl)butylamino]-s-triazine end-capped with 2-chloro-4,6-bis(dibutylamino)-s-triazine; and the compounds of formulae

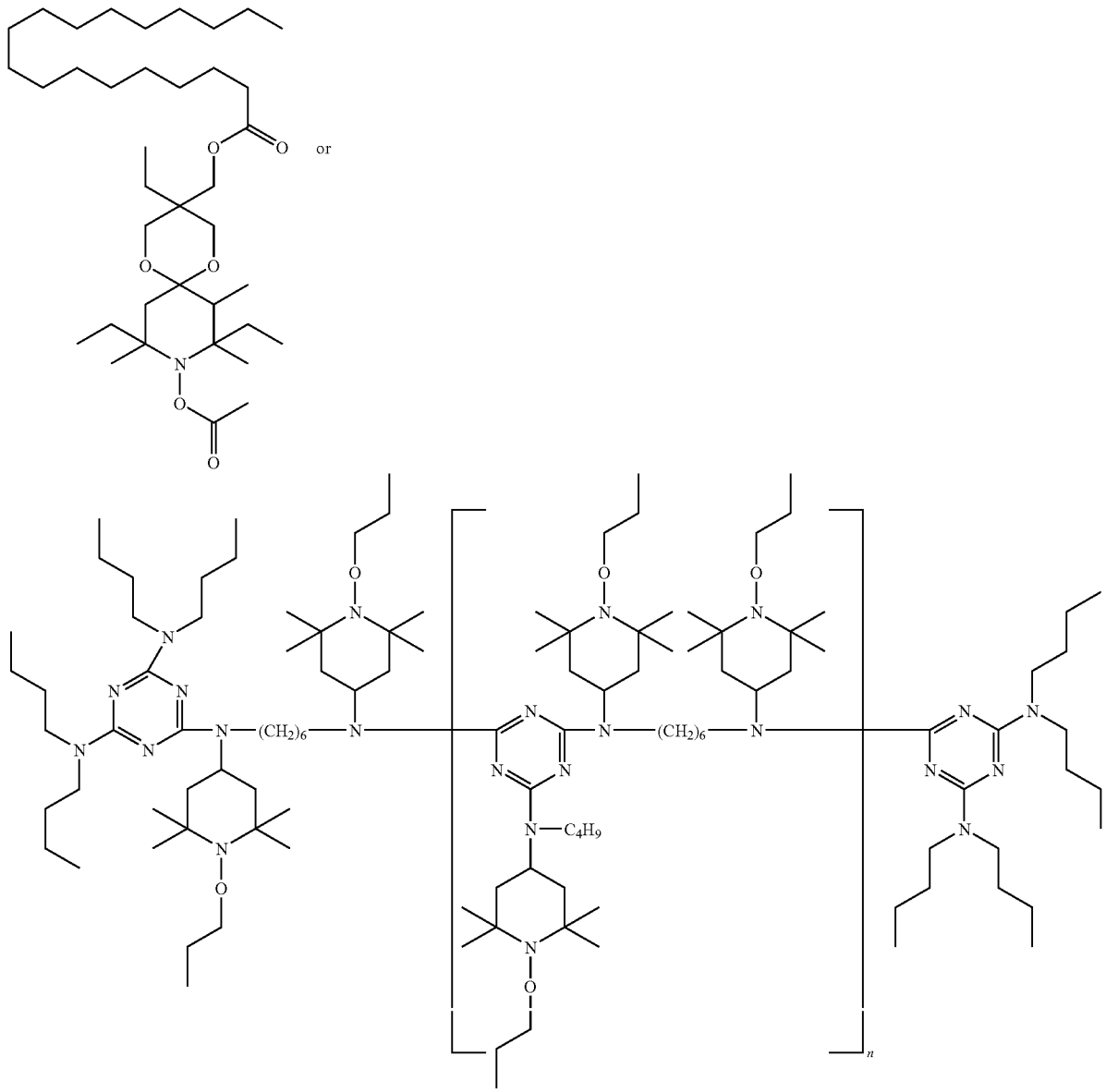

in which n is from 1 to 15.

7. A composition according to claim 1 wherein the metal salt of hypophosphorous acid is of formula (X)

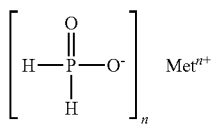

wherein Met is a metal selected from groups I, II, III or IV of the periodic table of elements; and n is a number from 1 to 4, corresponding to the charge of the metal ion.

8. A composition according to claim 7 wherein $Met^{n+}$ is $Na^+$, $Ca^{2+}$, $Mg^{2+}$, $Zn^{2+}$, $Ti^{4+}$ or $Al^{3+}$.

9. A composition according to claim 1 wherein the brominated flame retardant is selected from the group consisting of polybrominated diphenyl oxide,
decabromodiphenyl oxide,
brominated hydrocarbyl phosphates or phosphonates,
tris[3-bromo-2,2-bis(bromomethyl)propyl]phosphate,
tris(tribromoneopentyl)phosphate
tris(2,3-dibromopropyl)phosphate
tetrabromophthalic acid,
bis(2,3-dibromopropyl ether) of tetrabromobisphenol A,
brominated epoxy resin,
ethylene-bis(tetrabromophthalimide),
octabromodiphenyl ether,
decabromodiphenyl ether,
1,2-bis(tribromophenoxy)ethane,
hexabromocycododecane,
brominated diphenylethane,
tetrabromo-bisphenol A,
tetrabromo bisphenol A-bis(dibromopropyl)ether,
ethylene bis-(dibromo-norbornanedicarboximide), tris-(2,3-dibromopropyl)-isocyanurate,
ethylene-bis-tetrabromophthalimide, and
melamine hydrobromide.

10. A composition according to claim 1 wherein the N-alkoxyamine is present in an amount of from 0.02 to 1% by weight, based on the weight of the thermoplastic or elastomeric polymer, the metal salt of hypophosphorous acid is present in an amount of from 0.1 to 9% by weight, based on the weight of the thermoplastic or elastomeric polymer and the organobromine flame retardant is present in an amount of from 0.1 to 9% by weight, based on the weight of the thermoplastic or elastomeric polymer.

11. A composition according to claim 1 comprising additionally an additive selected from the group consisting of a UV absorber, a sterically hindered amine, a phenolic antioxidant, a phosphite or phosphonite and a benzofuranone or indolinone.

12. A thermoplastic or elastomeric masterbatch concentrate comprising the components b), c) and d) according to claim 1 in a total amount of from 10% to 90% by weight, based on the total weight of the masterbatch.

13. A flame retardant composition comprising
  a) at least one sterically hindered N-alkoxy amine;
  b) at least one metal salt of hypophosphorous acid; and
  c) at least one brominated flame retardant.

14. A method for improving the flame retardancy of a thermoplastic or elastomeric polymer comprising incorporating into the thermoplastic or elastomeric polymer a composition comprising
  a) at least one sterically hindered N-alkoxy amine;
  b) at least one metal salt of hypophosphorous acid; and
  c) at least one brominated flame retardant.

* * * * *